United States Patent [19]

Carmichael et al.

[11] Patent Number: 4,563,364

[45] Date of Patent: Jan. 7, 1986

[54] METHOD FOR STEAM BLANCHING FOODSTUFFS IN A PRESSURE VESSEL

[75] Inventors: D. Murphy Carmichael; Hans G. Haimberger, both of Milton-Freewater, Oreg.

[73] Assignee: Key Technology, Inc., Milton-Freewater, Oreg.

[21] Appl. No.: 619,280

[22] Filed: Jun. 11, 1984

[51] Int. Cl.[4] ............................................... A23B 7/06
[52] U.S. Cl. .................................... 426/510; 99/483; 426/511
[58] Field of Search .................. 426/510, 511; 99/483, 99/467

[56] References Cited

U.S. PATENT DOCUMENTS

| | | | |
|---|---|---|---|
| 2,403,871 | 7/1946 | McBean | 426/510 |
| 4,091,722 | 5/1978 | Kunz | 99/479 |
| 4,092,911 | 6/1978 | Goodale | 99/483 |
| 4,101,682 | 7/1978 | Kunz | 426/511 |
| 4,160,445 | 7/1979 | Kunz | 99/348 |
| 4,188,869 | 2/1980 | Komen | 99/483 |
| 4,222,322 | 9/1980 | van der Schoot | 99/483 |
| 4,238,997 | 12/1980 | Hengstenberg | 99/483 |
| 4,256,775 | 3/1981 | Kunz | 426/510 |
| 4,393,756 | 7/1983 | van der Schoot | 99/483 |

OTHER PUBLICATIONS

Karl Robe, "Hot Gas Blanching Reduces Waste Water 99%, Reduces BOD 96%", Food Processing, Jan. 1973.
Ray Rodriguez and Karl Robe, "New Processing Line Boosts Productivity 21%", Jan. 1978, Food Processing.
Donald James Entenman, "Evaluation of High Temperature Short Time Blanching of Carrots, 212°-290° Farenheit", 1969.
Richard Carmain Bower, "High Temperature-Short Time Water Blanching of Broccoli", 1973.
G. E. Brown, D. F. Farkas, and E. S. De Marchena, "Centrifugal Fluidized Bed Blanches, Dries, and Puffs Piece-Form Foods", Dec. 1972–Food Technology.
R. S. Mitchell, P. W. Board and L. J. Lynch, "Fluidized-Bed Blanching of Green Peas for Processing", vol. 22, 718, Jun. 1968, Food Technology.
Brochure, "The Thermo-Flo" by Key (Key Technology, Inc.), A Breakthrough in Steam Processing Technology, 1981.
"Venturi Steam Blancher Saves 50% in Fuel Costs", Jul. 1977, Food Processing.

*Primary Examiner*—George Yeung
*Attorney, Agent, or Firm*—Wells, St. John & Roberts

[57] ABSTRACT

Disclosed is a food product blanching and processing apparatus and method. The apparatus includes a weigh hopper and infeed conveyor having a pivoting infeed chute which can be retracted to prevent contamination of blanched product with incoming raw product. The infeed chute supplies incoming food products to a pressure vessel which is rotatably mounted within an enclosure. The pressure vessel has a lid assembly which allows the food product to be fed thereinto, yet can be tightly closed for pressurization of the interior of the vessel during the blanching and processing operation. The pressure vessel assembly is rotated into a discharge position and the food product is dumped against a discharge chute 18 which is extendable and retractable so that residual product can drain downwardly outside of the outfeed conveyor. The outfeed conveyor includes a hopper and conveyor which moves the blanched and processed food product onto associated food processing equipment. The method includes purging air from the product and vessel and then steam pressurization blanching of the food product inside the pressure vessel for a first predetermined period. The steam supply is terminated and reduction of blanching pressure occurs during a second predetermined period due to heat transfer to the product and from the vessel. The vessel is rotated to assure uniform blanching. The pressure is gradually decompressed to prevent damage to the product.

3 Claims, 7 Drawing Figures

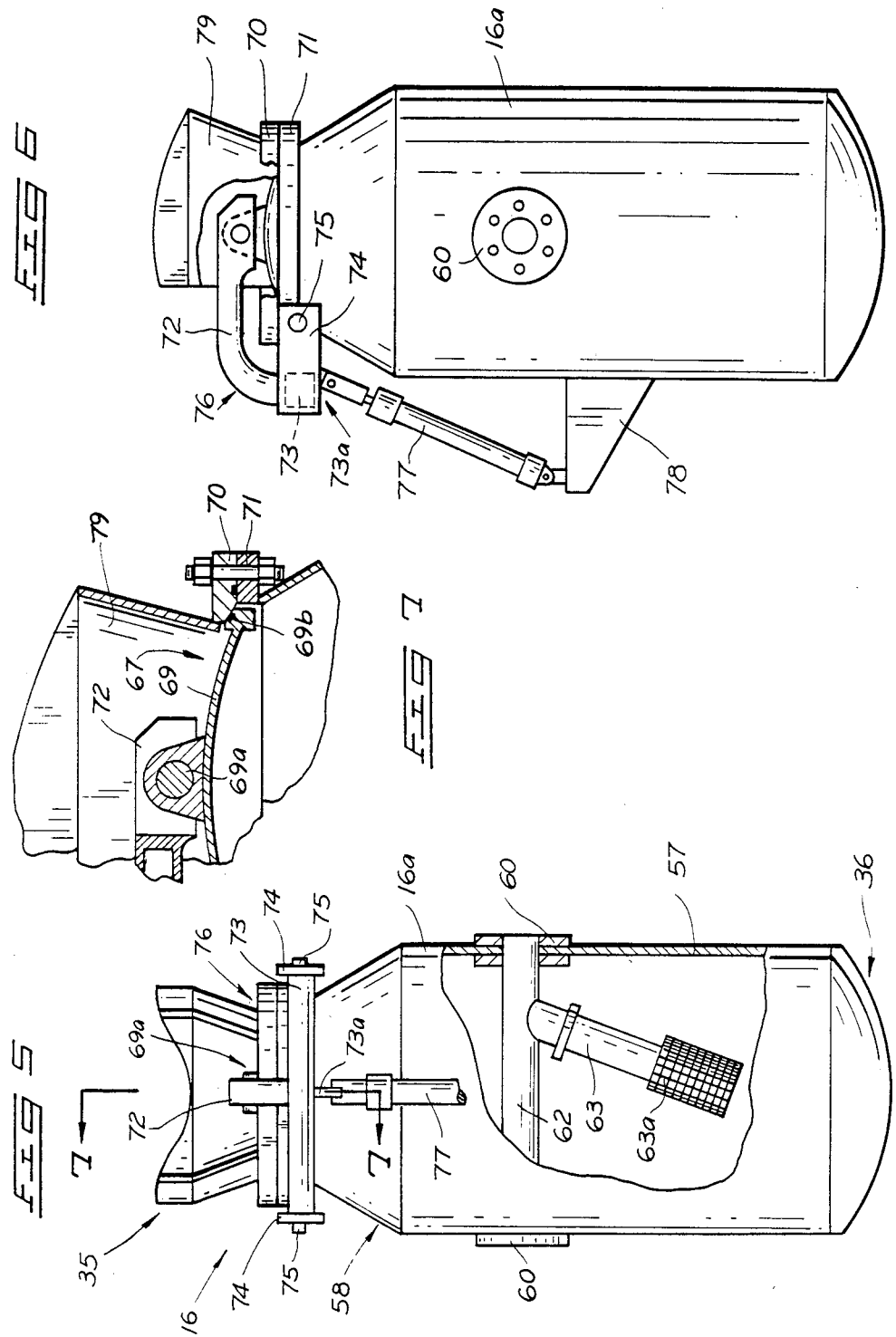

METHOD FOR STEAM BLANCHING FOODSTUFFS IN A PRESSURE VESSEL

TECHNICAL FIELD

The technical field of this invention is apparatus and methods for blanching and processing food products.

BACKGROUND OF THE INVENTION

The desirability of blanching vegetables, fruits, and other foodstuffs to prevent undesirable effects on quality during frozen, canned or dehydration storage has been recognized for many years. Although the effects of blanching may not be fully understood, it is generally recognized that blanching inactivates enzymes such as peroxidase and catalase which are naturally present in the foodstuffs. Inactivation of the enzymes prevents flavor degradation which may occur if the enzymes are present during storage.

Blanching typically involves bringing the vegetable or other foodstuff to an elevated temperature and holding it there for sufficient time to inactivate the enzymes. Blanching is also occasionally used to provide a pre-cooking for vegetables which have relatively hard flesh such as rutabagas, carrots and others.

The prior art includes several different types of blanching apparatus used by the food processing industry. U.S. Pat. No. 2,403,871 to McBean discloses a relatively long blanching apparatus incorporating a retort tube which extends lengthwise down the machine. An endless conveyor apparatus having a number of pistons mounted at spaced positions along the conveyor extends through the retort tube. The pistons are properly sized to fit snugly within the retort tube and to convey units of food lengthwise down the retort tube. Food product is fed in between the pistons at one end of the retort tube and is conveyed therethrough by the movement of the pistons. Steam is introduced at a plurality of points along the retort tube to heat and create increased pressure therein. Food exits from the retort tube in a continuous flow after being blanched.

U.S. Pat. No. 4,092,911 to Goodale discloses a blanching apparatus using an elongated conveyor contained within a sealed enclosure. Entrance and exit portals are used to maintain a slightly elevated pressure within the sealed enclosure. The entrance and exit portals use rotating vanes which prevent direct flow of steam from the enclosure.

U.S. Pat. No. 4,238,997 to Hingstenberg shows an apparatus for blanching sauerkraut. The Hingstenberg apparatus uses a plurality of drums or other chambers which are rotatably mounted for partial contact with a hot water or water brine bath. The rotatable drums are arranged in series with the water bath increasing in temperature from the inlet to the exit. Sauerkraut or other food products are fed into the inlet and rotated within the perforated drums. Communicating passageways between adjacent drums causes the excess in an upstream drum to spill over into the next drum in the series, thereby providing a continuous flow of food product through the blancher.

Other prior art blanchers include those incorporating a continuous water bath through which vegetables are moved in order to properly blanch them. Also included in the prior art are hydrostatic steam blanching systems having water baths at each end and conveyors which transport the food products beneath the water surface and into a steam containing tunnel wherein the vegetables are blanched.

Prior art steam blanching systems suffer from a number of problems which continue to cause inefficiencies. A primary problem suffered by prior art steam and water bath blanching apparatus is the large amount of floor space necessary. This is particularly true with elongated tunnel steam blanchers or water bath type blanchers. The large amount of floor space consumed by these blanchers create substantial additional cost associated with new plant capital cost and maintenance cost.

Another problem associated with steam tunnel type blanchers is the substantial amounts of lost steam which escape from the apparatus. The escaped steam is significant for at least two reasons. Firstly, the escape of steam represents a loss of substantial amounts of energy which must be paid for in the production of steam. Many of the prior art steam blanchers process only one or two pounds of food product for each pound of steam consumed. This substantial amount of steam consumption adds to the price of the resulting food product and to the amount of investment in steam generating capacity necessary to support the food blanching line. Secondly, the escaped steam creates excessive humidity in the production facility which increases the amount of air which must be vented.

Production capacity prior art steam blanchers have also been limited in that they generally are not capable of developing significant pressurization inside so as to allow the blanching time to be significantly reduced. The savings in the amount of time necessary to blanch the product is needed to increase throughput and hence provide more economical operation. Increased steam pressure and operating temperatures also have been found advantageous in terms of the resulting product quality. Flavor, texture and color are all found to be improved with higher temperature and reduced time blanching.

Prior art food blanchers also suffer from problems of food residue buildup on exposed heated surfaces and on internal surfaces which may come into contact with the product being process. Strict sanitation requirements in food processing plants necessitate that any residue buildup be minimized so that bacteriological growth is minimized and product flavor and appearance is not degraded.

It is an object of this invention to provide a food product blanching and processing apparatus which easily and economically receives and pressure blanches or processes vegetables or other food products using pressurized steam.

It is an object of this invention to provide a blancher or food processor which is capable tumbling the food product during blanching so that uniform blanching occurs amongst all of the food product.

It is another object of this invention to provide a food blancher or processing unit which requires a minimum of steam consumption in order to blanch vegetables, fruits and other food products.

It is an object of the invention to provide a food blancher or processor which uses a minimum amount of floor space in a factory in which it is installed.

It is a further object of the invention to provide a food blancher or processor which eliminates drippage and food residue from accumulating on hot surfaces of the machine and which prevents any raw product from entering into the finished product.

It is a still further object of this invention to provide a method for rapidly and uniformly blanching food products in a minimum of time using pressurized steam.

These and other objects and advantages of the invention will be apparent from the description of the preferred embodiment of the invention given herein.

BRIEF DESCRIPTION OF THE DRAWINGS

A preferred embodiment of this invention is illustrated in the accompanying drawings, in which:

FIG. 5 is an enlarged end elevational view of the pressure vessel included in FIG. 1, in isolation; portions have been broken away and are shown in cross section;

FIG. 6 is a side elevational view of the isolated pressure vessel of FIG. 5; and FIG. 7 is a partial side elevational view showing the pressure vessel lid sealing arrangement.

DETAILED DESCRIPTION OF THE PREFERRED EMBODIMENT

In compliance with the constitutional purpose of the Patent Laws "to promote the progress of science and useful arts" (Article 1, Section 8), applicant submits the following disclosure of the invention.

Figure 1:
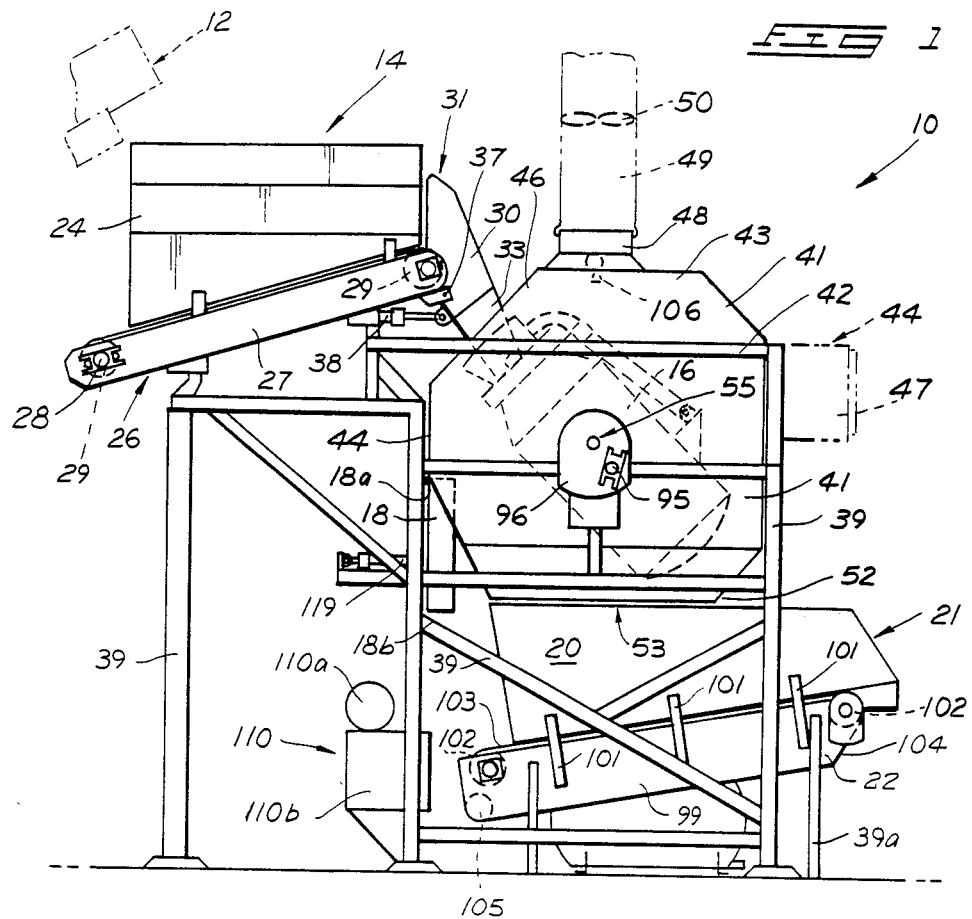
FIG. 1 is a side elevational view showing a food blancher and processor according to this invention.

FIG. 1 shows a preferred embodiment food blancher or processor 10 according to this invention. Blancher 10 is supplied with raw food product via a supply conveyor 12 which is partially shown in phantom lines. Supply conveyor 12 feeds raw food product into an infeed means 14 forming a part of the blancher 10. Infeed means 14 preferably weighs and transfer the incoming product into a pressure vessel assembly 16 shown in hidden lines. Vegetables or other food products are blanched or otherwise heat and pressure processed within pressure vessel assembly 16 preferably using steam, although other fluids could conceivably be used. Pressure vessel assembly 16 is rotated to assure even blanching of the food product being processed therein.

The blanched food product is discharged from pressure vessel 16 against a discharge chute 18 from which is slides into an outfeed means 21 which includes an outfeed hopper 20. The outfeed means 21 also includes an outfeed conveyor 22 mounted beneath hopper 20 for receiving and conveying the blanched food product from blanching apparatus 10.

The above general description of the major parts was given as an overview. A more detailed explanation of the various components of food processor 10 will now be given.

Infeed means 14 preferably includes a weigh hopper 24 and an infeed conveyor 26. Weigh hopper 24 allows a quantity or batch of food product to be accumulated therein resting on infeed conveyor 26. Infeed means 14 is mounted on weigh cells or other weigh means so that the foodstuffs contained therein can be weighed. Blancher 10 can thus be properly supplied with particular batch sizes of food products for processing therein.

Weigh hopper 24 has an open bottom which allows food to be conveyed from left to right as shown in FIG. 1, using infeed conveyor 26. Infeed conveyor 26 includes side frames 27 which support rotatable axles 28 having conveyor rollers 29 mounted thereon. An endless conveyor belt is arranged over conveyor rollers 29 to transport raw food product upwardly and into an infeed chute 30.

Infeed chute 30 extends from the outlet end 31 of infeed conveyor 26 toward the pressure vessel 16 when the infeed chute is located in the extended or filling position shown in FIG. 1. Infeed chute 30 has a discharge end portion 33, preferably made of flexible material such as synthetic rubber, which directs food product directly into the top or opening end 35 of pressure vessel 16 (see FIG. 5). Infeed chute 30 can be pivoted about pivot 37 into a retracted position using an infeed chute ram 38. Ram 38 is preferably hydraulic and is pivotally attached to frame 39 or infeed conveyor 26 at one end, and to infeed chute 30 at the opposite end.

Figure 2:
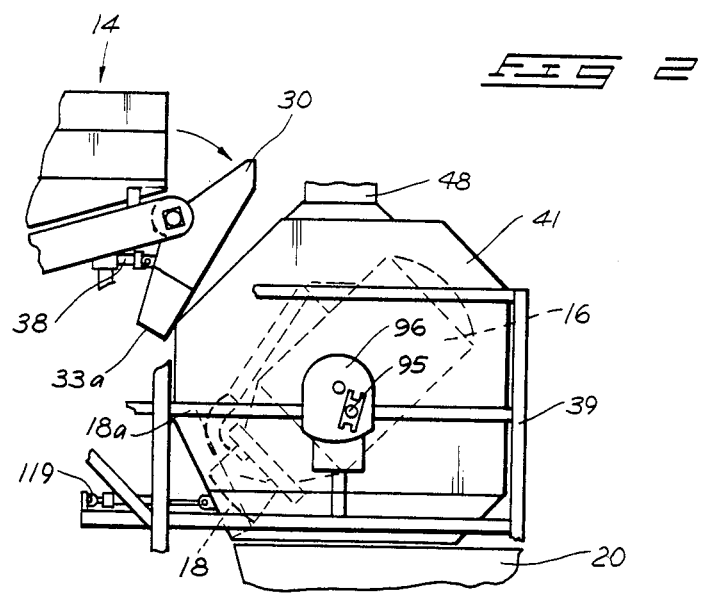
FIG. 2 is a partial side elevational view similar to FIG. 1 showing the pressure vessel rotated into a dumping position; portions have been removed for clarity.

When the infeed chute is in the retracted position, a discharge opening 33a at the end of discharge end portion 33 is positioned downwardly and away from pressure vessel 16 and related parts as shown in FIG. 2. This allows any residual raw food products, juice and water to drip downwardly but at points removed from the hot surfaces of pressure vessel 16, pressure vessel enclosure 41 and away from outfeed means 21, thereby preventing contamination of blanched product with raw pieces or juices.

The blanching or food processing apparatus 10 includes a structural framework 39 mounted to a supporting surface and having a plurality of columns, beams and anti-sway bars as shown in the Figs. Structural framework 39 supports infeed means 14 and outfeed means 21 using a substructure 39a. Structural framework 39 also supports pressure vessel assembly 16 and pressure vessel enclosure means 41 which surrounds and substantially or approximately encloses the pressure vessel.

Pressure vessel enclosure means 41 includes side walls 42, top 43 and end panels 44. Pressure vessel enclosure means includes an infeed opening 46 adjacent to infeed chute 30 so that the discharge end portion 33 can pivot and extend therethrough for filling pressure vessel 16. An access door 47 is also advantageously included to provide easy access into the interior of pressure vessel enclosure means 41. Pressure vessel enclosure means 41 also includes a steam discharge port 48 at the top for allowing steam to be vented using a fan 50 which is diagrammatically depicted in FIG. 1.

Pressure vessel enclosure means 41 has an outfeed or bottom opening 52 at the bottom 53 of the enclosure. Bottom opening 52 communicates with the open top of outfeed hopper 20 thereby allowing processed food product to be conveyed from the enclosure means 41 into the outfeed hopper.

Pressure vessel assembly 16 is rotatably mounted within pressure vessel enclosure means 41 for rotation about pivot axis 55. FIGS. 5 and 7 show a preferred embodiment pressure vessel assembly 16 in greater detail. The pressure vessel 16a has an opening or top end 35 and a bottom or closed end 36. Pressure vessel 16a also preferably has a cylindrical side wall 57 and a bonnet portion 58 located near the top end.

Pressure vessel assembly 16 includes a pair of trunnion connection flanges 60 for connecting trunnions or stub shafts 61. Trunnions 61 are rotatably mounted upon structural framework 39 using bearings (not shown). Trunnion connection flanges 60 also have a tubular member 62 extending therebetween through the interior of the pressure vessel. Tubular member 62 is primarily for conveying steam to a purge extension 63 which extends downwardly toward the closed or bottom end 36 of pressure vessel 16a. Purge extension 63 includes a perforated or screen section 63a which allows steam to emit therefrom in all direction and at a point adjacent the closed end of the vessel, thereby helping to purge air from the vessel prior to pressurization.

Pressure vessel assembly 16 includes a lid assembly 76 which acts as a closure means which seals pressure vessel opening 67 formed at the top or opening end 35. The lid assembly or closure means includes a lid 69 which seals against an upper top flange 70 preferably using circumferential seal 69b. Upper top flange 70 is mounted against a lower top flange 71. Lid 69 is preferably pivotally connected at pivot 69a to a connection arm 72 which extends across above the upper top flange 70 and curves downwardly and extends alongside the pressure vessel. Connection arm 72 is connected to a transverse arm bar 73 which is rigidly connected to two end plates 74 at opposite sides of the vessel. End plates 74 are pivotally mounted to pressure vessel assembly 16 at pivots 75. Lid assembly 76 includes connection arm 72, transverse arm bar 73 and end plates 74 which together pivot in unison about pivot 75.

Lid assembly 76 also preferably includes an actuating ram 77 which is pivotally mounted at its lower end to a side bracket 78 and at its upper end to the transverse arm bar 73 via an arm bar bracket 73a. Actuating ram 77 is extendable or contractible in length so as to rotate the lid assembly 76 about pivot 75 to open the pressure vessel by moving lid 69 inwardly and to close the pressure vessel by moving lid 69 outwardly and against the upper top flange 70.

Pressure vessel assembly 16 also advantageously includes a brim 79 which helps to contain and guide food product into and from opening 67. Brim 79 extends only about three sides of the pressure vessel assembly 16.

Steam is supplied to pressure vessel 16a from a source of steam such as a boiler or other steam generating means (not shown). The supply of steam enters through an incoming steam line 80 (see FIG. 3) and through a control valve system 81. Branch piping 84 carries the incoming steam to a mechanical sealing assembly 85 which is preferably a packing arrangement well known in the art. Sealing assembly 85 allows rotation of trunnions 61 while providing leak tight connection of the steam supply system. Steam flows from the sealing assembly 85 through trunnions 61 and into pressure vessel 16a.

Branch piping 84 is also connected to a second control valve 87 which allows steam and air contained within pressure vessel 16a to be exhausted prior to opening the lid. Second control valve 87 is connected to an exhaust tank 88 using piping 89. Steam is condensed in exhaust tank 88 using a circulation of plant water. The water is supplied through line 91a and drained to a plant waste water system through line 91b. Remaining steam and air are vented from exhaust tank 88 through a second piping system 90 which is usually vented to atmosphere.

Figure 3:
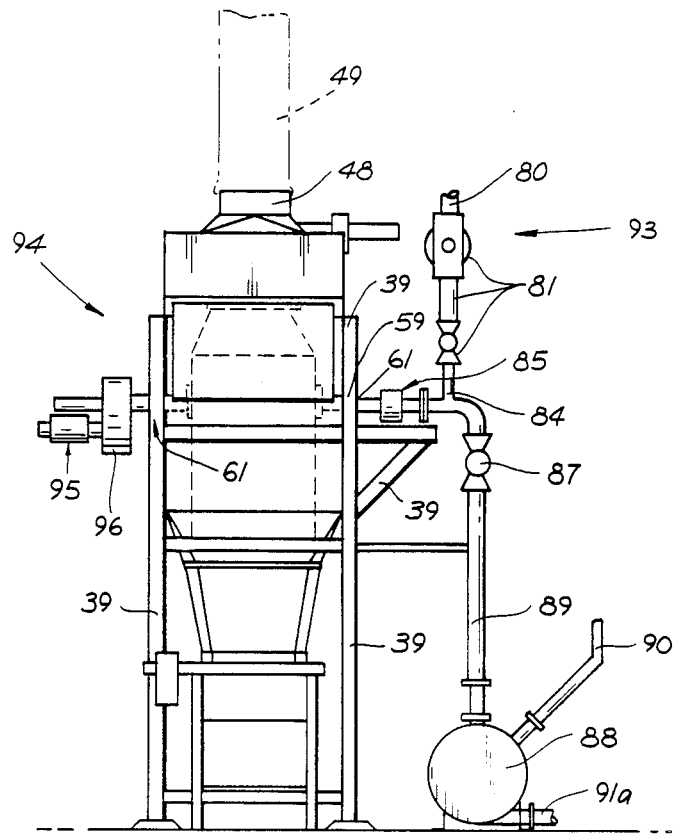
FIG. 3 is an end elevational view of the outfeed end of the blancher shown in FIG. 1.
Figure 4:
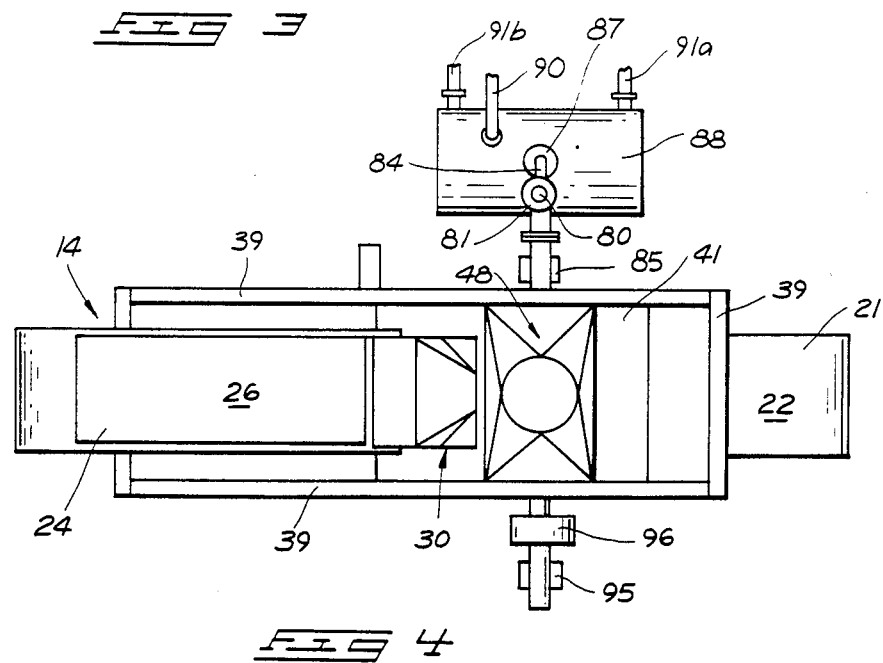
FIG. 4 is a top view of the blancher shown in FIGS. 1-3.

The sides of blancher 10 can be identified as being either the steam side 93 or the drive side 94 (see FIG. 3). Drive side 94 has a hydraulic, electric, or other drive motor 95 which is connected to drive a gear reduction unit 96. Gear reduction unit 96 is connected to a trunnion 61 which is supported within a trunnion bearing (not shown) mounted to structural framework 39. The trunnion bearings allow trunnions 61 to easily rotate therein, thereby allowing the pressure vessel assembly 16 to rotate when driven by drive motor 95.

The pressure vessel assembly 16 discharges blanched product against a discharge chute 18. Discharge chute 18 is preferably pivotally connected to pressure vessel enclosure means 41 at hinge 18a. Discharge chute 18 is pivotable between a discharge portion shown in FIG. 2 and a drain position shown in FIG. 1. A discharge chute ram 119 is used to remove the discharge chute between these positions.

In the discharge position the discharge chute is angled inwardly to convey blanched food product into the outfeed means 21. In the drain position the discharge chute extends downwardly so that the lower edge 18b is outside of the outfeed means,. This allows residual juice and food product to drop onto the floor for easy cleanup rather than accumulating and becoming stuck to the hot surfaces of the blancher.

Outfeed means 21 receives food product from discharge chute 18 and transfers it on to other food processing equipment. Outfeed means 21 includes a discharge hopper 20 which is positioned below the discharge chute 18 and the bottom opening 52 of pressure vessel enclosure means 41. Discharge hopper 20 has an open bottom which allows food product to rest upon outfeed conveyor 22. Outfeed conveyor 22 can be a variety of types with a preferred embodiment having side rails 99 which are supported by an outfeed conveyor structural framework 39a. Hopper support bars 101 extend upwardly from side rails 99 to support the outfeed hopper 20 thereon. Outfeed conveyor 22 includes at least two conveyor rollers 102 which have an outfeed conveyor belt 103 arranged thereabout. An outfeed conveyor motor 104 drives the conveyor belt 103 in a clockwise direction so that food product is moved from outfeed means 21, to the right as shown in FIG. 1 to be discharged from the blancher.

Blanching apparatus 10 also preferably includes a pressure vessel washdown assembly 106 which is mounted within pressure vessel enclosure means 41 at a point above the pivot axis 55. Pressure vessel washdown means 106 preferably is a pipe supplied with water and having a wide angle spray nozzle for spraying vessel assembly 16 and the inside of enclosure 41. Another washdown nozzle (not shown) can advantageously be included near the top of infeed chute 30 to wash incoming food product down the chute and into pressure vessel 16a.

A hydraulic supply unit 110 can advantageously be included with the blanching apparatus 10. Hydraulic supply unit 110 includes a reservoir 110a and an enclosure 110b for holding an electric driven hydraulic motor (not shown). Pressurized hydraulic fluid is used to drive motor 95. A plant or other air supply can also be used to activate control valves 81 and 87 and for other purposes such as driving infeed conveyor 15 and outfeed conveyor 22 if desired.

The blanching and food processing apparatus 10 is preferably constructed according to well known manufacturing techniques. The parts are preferably made of stainless steel for all parts that contact the food product or which become exposed to food or juices therefrom. The remaining components such as the structural framework can advantageously be constructed of galvanized or painted carbon steel or other suitable structural metals. All parts can be made from a variety of materials suitable for the conditions implied and discussed above.

The operation of the blanching and processing apparatus 10 and methods of this invention will now be more fully considered.

Incoming raw food products are conveyed to the blanching and processing apparatus 10 via supply conveyor 12. Incoming food product cascades over the end of supply conveyor 12 and into weigh hopper 24. A desired batch weight is loaded into weigh hopper 24 and then the supply conveyor 12 is stopped. Infeed conveyor 26 is then readied for operation by placing infeed chute 30 into the fill position shown in FIG. 1. This is done by extending the infeed chute using ram 38. Infeed conveyor 26 is then actuated and food product contained within weigh hopper 24 is moved upwardly over and into the infeed chute 30. The food product drops through infeed chute 30 and vessel opening 67 into the pressure vessel assembly 16. The pressure vessel assembly 16 has been previously readied by placing it into the fill position shown in FIG. 1 and opening lid assembly 76. The raw food product fills into the pressure vessel until the contents of the weigh hopper have been fully transferred. A spray nozzle (not shown) can advantageously be included in the infeed chute 30 for rinsing remnants into the vessel.

Pressure vessel assembly 16 is then rotated into a vertical upright position (not shown) and the discharge chute 18 is extended into the extending position shown in FIG. 2. The lid assembly 76 is then nearly closed and the wash down nozzle 106 is activated to wash the outer surfaces of the pressure vessel assembly. The wash also washes the inside surfaces of pressure vessel enclosure 41 to maintain the surfaces in sanitary condition by removing any food products and juices deposited during dumping of the previous cycle. After the washing, the discharge chute 18 is retracted into the retracted drain position shown in FIG. 1.

Steam is then supplied to the pressure vessel shortly before lid assembly 76 seals opening 67 closed. This allows air to be purged from the vessel interior and the food product therein. Purge extension 63 greatly improves the effectiveness of the purge by introducing the steam at the bottom to force the contained air upward and outwardly. Perforated section 63a of the purge extension disperses the incoming steam in all directions.

When the lid is closed and pressure builds, then the control system activates the hydraulic vessel drive motor 95 and the vessel is rotated, preferably counterclockwise as seen in FIG. 1.

Steam is supplied to the vessel interior through the trunnion 61 on the steam side 93. Steam is supplied to the inside of pressure vessel 16a for a predetermined amount of time and at a predetermined pressure dependent upon the type of food product being blanched and/or processed. The steam is then shut off by closing control valve system 81. The pressure vessel assembly 16 is rotated in order to assure even steam distribution and heat distribution within the pressure vessel and food product during the blanching process. Rotating pressure vessel assembly 16 tumbles the enclosed food product, improving heat transfer and helping to assure uniform product quality.

The steam supply to pressure vessel assembly 16 is preferably shut off prior to the completion of the blanching of processing cycle. This allows the pressure within the vessel 16 to gradually decrease in response to the heat absorbed by the food product, heat transferred out of the vessel, and as the steam otherwise condenses within the vessel. After a predetermined retention time has run and the pressure has dropped, then the steam exhaust valve 87 is opened and the remaining steam pressure is released through exhaust tank 88. The reduced steam pressure must be reached prior to exhausting vessel 16 or else the food product is damaged during the rapid decompression which would occur upon opening of the lid assembly.

The pressure vessel assembly 16 is stopped from rotation and positioned in an approximately upright vertical position with the top end 35 upwardly. The lid assembly 76 is the opened and the discharge chute 18 is extended into the discharge position shown in FIG. 2. Pressure vessel enclosure means 41 reduces the escape of steam when lid assembly 76 is opened by surrounding and substantially enclosing the pressure vessel. The exhaust duct 49 and exhaust fan 50 draw off the steam escaping from pressure vessel 16 so that it can be properly vented outside the production building.

A brief wash cycle can then occur to water down the discharge chute, outfeed hopper and outfeed conveyor when heavy or sludge containing foods are processed.

The opened pressure vessel assembly is rotated into the discharge position shown in FIG. 2 to discharge its food product contents. The discharging food product falls against discharge chute 18 and then into the outfeed means 21. The blanched food product can then be conveyed onwardly by outfeed means 21 to other food processing equipment such as freezers, canners or dehydration equipment.

The methods of this invention have been generally described above with respect to operation of blancher 10.

The methods basically involve charging the pressure vessel with the food products and then purging the air from the pressure vessel and contained food products. Steam is injected into the vessel and through the food to pressurize and heat the food products. The pressure within the vessel is raised to a cycle maximum pressure and held there for a predetermined first period of time. The inflow of further steam is then stopped and the pressure vessel is held in a closed state as the steam heats the product. Heat transfer within and to the outside of the vessel causes the pressure to decrease during a second predetermined time period. The remaining steam pressure is exhausted without rapid decompression. Exhausting the remaining steam causes the vessel pressure to approach atmospheric pressure so that opening the lid assembly does not rapidly decompress and injure the food products. Finally, the food products are discharged from the vessel for further processing.

The examples given hereafter will exemplify the methods further with respect to specific pressures and times for two types of food products. Specific pressures and times for other foods will be readily ascertainable for the specific apparatus and weights being used, with minor experimentation.

EXAMPLE I

A food blancher processor 10 as described above was constructed for experimental testing. The pressure vessel had a capacity of 1400 liters. Shelled green peas were supplied to the pressure vessel in amounts shown in the following Table A. The blanching of the green peas occurred as described above with the following noteworthy explanations and specifics.

The time during which steam was supplied to the pressure vessel is shown in Table A under "Steam Supply Time". Live steam supply was started approximately 0.5 to 1.0 seconds prior to the time lid assembly 76 was closed shut, thereby allowing air to be purged from the vessel interior by the inrushing steam injected at the bottom by purge extension 63. The steam was supplied for the specified time and then the steam supply was stopped but not exhausted until an "Exhaust Delay Time" had expired as shown in Table A. The pressure of the steam supplied to the vessel is shown under "Steam Pressure". The pressure vessel assembly 16 was rotated continuously at an approximate angular speed of 5 revolutions per minute during both Steam Supply and Exhaust Delay times.

TABLE A

| PRODUCT WEIGHT (lbs.) | STEAM PRESSURE (psig.) | STEAM SUPPLY (sec.) | EXHAUST DELAY (sec.) |
|---|---|---|---|
| 1000 | 20 | 100 | 30 |
| 1150 | 50 | 40 | 90 |
| 800 | 80 | 18 | 30 |

All of the above tests resulting in high quality blanched green peas which were shortly thereafter frozen in packages and kept for various periods of time according to well known frozen food techniques.

EXAMPLE II

The foodblancher processor 10 as described above, including the description of Example I, was used to blanch green beans rather than green peas. Similar procedures and definitions apply as in Example I. Table B shows the times, pressures, and weights found to produce high quality blanched product.

TABLE B

| PRODUCT WEIGHT (lbs.) | STEAM PRESSURE (psig.) | STEAM SUPPLY (sec.) | EXHAUST DELAY (sec.) |
|---|---|---|---|
| 100 | 20 | 10 | 90 |
| 200 | 20 | 19 | 90 |
| 600 | 20 | 30 | 90 |
| 600 | 20 | 40 | 90 |
| 100 | 60 | 5 | 60 |
| 180 | 60 | 5 | 90 |

Some sloughing of green bean pods occurred at the 60 psig. pressure but effective blanching was performed notwithstanding.

The methods of this invention provide a fast economical method for blanching not only green peas and green beans but other vegetables such as corn, carrots, cauliflower, broccoli, and green lima beans. The exact time and pressure relationships will vary depending on the product being blanched and the size of the batch.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A method for pressure blanching a batch of foodstuffs in a blancher having a pressure vessel with a vessel opening which is opened and closed by a lid assembly, the vessel being mounted for rotation about an approximately horizontal axis of rotation, comprising:
   opening the lid assembly;
   placing the batch of foodstuffs through said vessel opening and into the pressure vessel;
   injecting pressurized steam into the vessel at a point removed from said vessel opening to purge air from the vessel and foodstuffs contained therein;
   thereafter closing said lid assembly to seal the vessel into a pressure tight condition;
   thereafter continuing to inject pressurized steam into the vessel until the pressure within the vessel reaches a predetermined maximum pressure;
   rotating the closed vessel about the horizontal axis of rotation to tumble the foodstuffs while maintaining the pressure within the vessel at the predetermined maximum pressure for a first predetermined period of time by injecting steam into the vessel;
   blocking steam flow to and from the vessel after said first predetermined period of time;
   allowing the pressure within the vessel to decrease as heat is absorbed by the foodstuffs and heat is lost from the vessel; the pressure decreasing during a second predetermined period of time which is sufficient to allow the pressure within the vessel to approximate atmospheric pressure;
   exhausting remaining pressurized steam from the vessel after said second predetermined period of time;
   opening the lid assembly; and
   discharging blanched foodstuffs from the vessel through said vessel opening for further processing.

2. The method of claim 1 wherein the vessel is rotated about the horizontal axis of rotation, during at least portions of both said first and second predetermined periods of time.

3. The method of claim 1 wherein the lid assembly is placed in a partially closed position during said step of injecting pressurized steam into the vessel at a point removed from said vessel opening.

* * * * *